(12) United States Patent
Menard et al.

(10) Patent No.: US 7,474,591 B2
(45) Date of Patent: Jan. 6, 2009

(54) SIX-COMPONENT SEISMIC DATA ACQUISITION SYSTEM

(75) Inventors: Jean-Paul Menard, Pornic (FR); Jérôme Laine, Sautron (FR)

(73) Assignee: Sercel, Carquefou (FR)

( * ) Notice: Subject to any disclaimer, the term of this patent is extended or adjusted under 35 U.S.C. 154(b) by 137 days.

(21) Appl. No.: 11/349,333

(22) Filed: Feb. 8, 2006

(65) Prior Publication Data
US 2007/0153631 A1 Jul. 5, 2007

(30) Foreign Application Priority Data
Dec. 29, 2005 (FR) ................................. 05 13444

(51) Int. Cl.
*G01V 1/18* (2006.01)
(52) U.S. Cl. ...................................... 367/178
(58) Field of Classification Search .................. 367/178; 73/510
See application file for complete search history.

(56) References Cited

U.S. PATENT DOCUMENTS

| 4,445,376 A | * | 5/1984 | Merhav | 73/510 |
| 4,512,192 A | * | 4/1985 | Peters | 73/510 |
| 4,590,801 A | * | 5/1986 | Merhav | 73/510 |
| 5,383,363 A | * | 1/1995 | Kulmaczewski | 73/510 |
| 6,128,955 A | * | 10/2000 | Mimura | 73/510 |
| 6,576,103 B2 | * | 6/2003 | Abramovich et al. | 204/412 |
| 6,868,356 B2 | * | 3/2005 | Nai et al. | 33/502 |
| 7,106,189 B2 | * | 9/2006 | Burneske et al. | 340/539.13 |
| 2003/0079358 A1 | * | 5/2003 | Nai et al. | 33/503 |
| 2007/0153631 A1 | * | 7/2007 | Menard et al. | 367/178 |

FOREIGN PATENT DOCUMENTS

FR 2594957 A1 * 8/1987
WO WO 2007074168 A1 * 7/2007

OTHER PUBLICATIONS

EENTEC Model R-1; Aug. 2003; http://web.archive.org/web/20030803034708/www.eentec.com/R-1_data_new.htm, 2 pages.*
EENTEC Model EA-120; Aug. 2003; http://web.archive.org/web/20030803030824/www.eentec.com/EA-120_data_new.htm, 3 pages.*

* cited by examiner

*Primary Examiner*—Dan Pihulic
(74) *Attorney, Agent, or Firm*—Law Office of Tim Cook P.C.

(57) ABSTRACT

A seismic data acquisition system includes a plurality of sensors which are arranged so they can be used to measure translation movements of a medium with three independent spatial components and of the rotation movements around each of the three independent spatial components, thus forming a six-component system.

14 Claims, 2 Drawing Sheets

SIX-COMPONENT SEISMIC DATA ACQUISITION SYSTEM

AREA OF THE INVENTION

The invention concerns a seismic data acquisition system capable of measuring translation and rotation movements.

The invention more precisely concerns a seismic data acquisition system capable of measuring translation movements with three independent spatial components, and rotation around these three components.

The invention therefore more precisely concerns a seismic data acquisition system capable of performing measurements on six spatial components, namely three in translation and three in rotation.

Such a system is therefore known as a six-component system or a full wave system.

PRIOR ART

Current seismic data acquisition systems employ seismic sensors, planted in the ground, such as a geophone or an accelerometer, which are inertial sensors of the mass-spring type. These systems are used to measure the vertical component of a wave reflected by the various underground layers following a disturbance of the ground generated at the surface by a suitable means.

The systems used conventionally in the seismic industry are therefore most often used to measure movement involving a single, vertical component. Moreover, the current systems measure the effects of motion which can be associated with a translation movement, a rotation movement, or a movement combining the two, without the ability to make the distinction.

In order to improve the existing devices, the professional engineer has proposed the use in these acquisition systems of a sensor for movements with three orthogonal components, allowing measurements to be taken, on the medium about which one wishes to know more, in terms of three components, namely a vertical component and two mutually-orthogonal horizontal components.

These devices are advantageous, to the extent that, by suitable digital processing, they can be used to eliminate the surface waves detected by the said systems, and thus recording only the waves actually emitted by a disturbance of the ground and reflected by the underground layers.

Nevertheless, these systems remain incomplete, to the extent that they never allow us to distinguish between movements of the medium associated with a rotation or a translation.

In order to improve elimination of the unwanted waves, it is necessary to have full knowledge of the movement of the medium in which the sensor module is implanted.

In order to ascertain the rotation movements, the professional engineer is also familiar with different measurement systems, such as gyroscopes for example. These gyroscopes are either of the inertial type, using a wheel revolving at high speed, or optical, as in the case of a Sagnac interferometer. These components are relatively expensive and/or bulky however.

The current solutions must therefore be improved. In particular, the current seismic data acquisition systems must be improved in order to simultaneously effect the measurement of translation movements with three spatial components, preferably orthogonal, and the rotation around these three same components in space.

SUMMARY OF THE INVENTION

This objective is achieved in the context of the present invention by virtue of a seismic data acquisition system, wherein it is included means which are arranged so that they can be used to measure translation movements of a medium with three independent spatial components, and the rotation movements around each of these three independent components, thus forming a six-component system.

The seismic data acquisition system according to the invention can also have at least one of the following characteristics:
- the means forming a six-component system include at least six motion sensors;
- the motion sensors are of the translation motion sensor type;
- the system includes a module accommodating the motion sensors, which are arranged in a quasi-unspecified way in respect of position and direction, so that a matrix (A), linking a vector $\overline{m}$ representing the movements measured by the sensors and a vector $\overline{v}$ representing the actual movements of the medium, is invertible;
- the motion sensors are arranged in pairs so that the motion sensors of one pair of sensors are positioned symmetrically to each other in relation to the geometrical centre of the module;
- the motion sensors are arranged so that the geometrical axis passing through the motion sensors of one pair of sensors is orthogonal to the geometrical axis passing through the motion sensors of another pair of sensors;
- each motion sensor includes one sensitive axis, with the motion sensors of a pair of sensors being arranged so that their sensitive axes are parallel;
- the motion sensors are arranged so that the parallel sensitive axes of one pair of sensors are orthogonal with the parallel sensitive axes of another pair of sensors;
- the module is of cubic shape;
- the means forming a six-component system include at least three translation sensors and at least three rotation sensors.

BRIEF DESCRIPTION OF THE DRAWINGS

Other characteristics, aims and advantages of this present invention will appear more clearly on reading the following detailed description, with reference to the appended drawings which are provided by way of non-limited examples, and in which:

FIG. 2b shows the data acquisition system of FIG. 2a, with the same view in section, subjected to a rotation movement around an axis that is orthogonal to the direction of the translation movement of FIG. 2a;

DETAILED DESCRIPTION OF THE INVENTION

Figure 1:
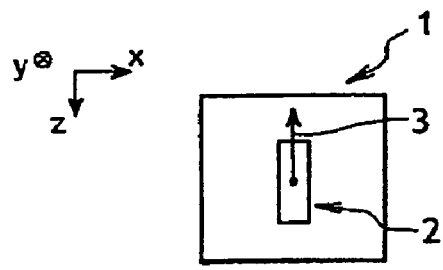
FIG. 1 is a diagrammatic view in section of a data acquisition system according to prior art.

FIG. 1 presents a view in section of a data acquisition system according to prior art techniques, in the form of a module 1 having at its centre a motion sensor 2 with a sensitive axis 3, used to perform the measurement of movements involving a single component in space. More precisely, this motion sensor 2 is capable of measuring a movement involving the vertical component (z axis) of the wave reflected in the various sub-layers following a disturbance of the ground generated at the surface. This motion sensor 2 is typically a geophone measuring speed, or an accelerometer.

Such a seismic data acquisition system, including a device of the mass-spring type sensitive to linear acceleration (translation or a movement that may be interpreted locally as a translation) is quite incapable of identifying accelerations arising from a rotation movement, and therefore of distinguishing between accelerations associated with a rotation movement of the accelerations linked to a translation movement.

Figure 2A:
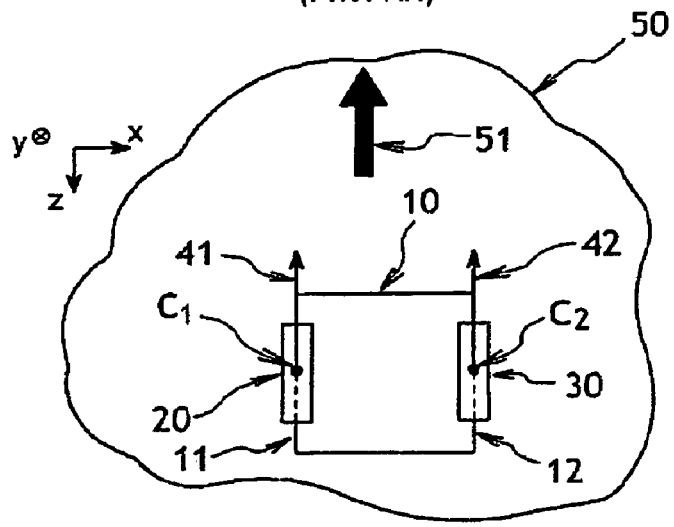
FIG. 2a is a diagrammatic view in section of one preferred method of implementation, provided by way of a non-limited example, of a data acquisition system according to the invention, where the said system is subjected to a movement in translation.
Figure 2B:
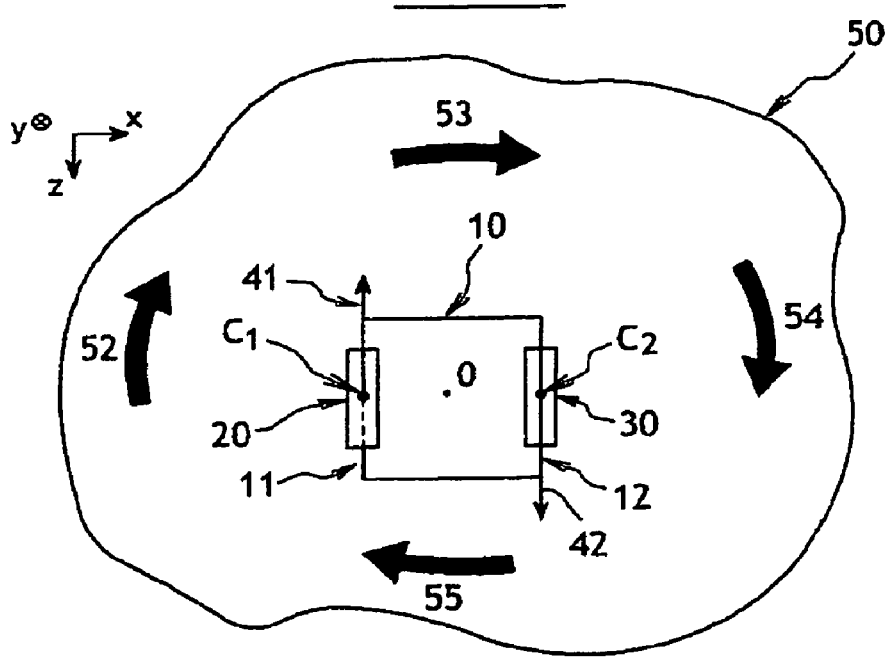

FIGS. 2a and 2b provide a view in section of a pair of motion sensors of a six-component seismic data acquisition system according to one preferred method of implementation of the invention. The description provided to explain these figures is able to show only part of a six-component system according to the invention, since the system is shown only partially by the view in section.

This pair of motion sensors is in fact used to measure translation movements according to a first component in space and rotation movements around another component in space, orthogonal to the first component. For its part, the complete system will be described later, with reference to FIG. 3.

In FIGS. 2a and 2b, the seismic data acquisition system has one module 10 and two motion sensors 20, 30 which are translation motion sensors. The motion sensors 20, 30 are of the type of motion sensor used in prior art, and which each includes at least one, and preferably only one, sensitive axis, referenced as 41 and 42 respectively.

The motion sensors 20, 30 are positioned symmetrically to each other in relation to the geometrical centre (O) of the module 10.

The sensors 20, 30 are fixed to the module 10 of the data acquisition system so that their respective sensitive axes 41, 42 are parallel and preferably with a common direction and sense.

The module is of parallelepiped and preferably cubic shape.

More precisely, the sensors 20, 30 are fixed respectively to two parallel and opposite faces 11, 12 of the module 10 of the data acquisition system, with the sensitive axes 41 and 42 belonging respectively to the planes defined by these faces 11 and 12.

More precisely again, the sensors 20, 30 are fixed to the centre of the faces 11, 12 of the module 10.

The motion sensors 20, 30, can be either speed or acceleration sensors. However, in the remainder of the description, and with a view to simplification, only the case in which the motion sensors 20, 30 are speed sensors is described.

In FIG. 2a, the system according to this present invention, shown partially with one pair of motion sensors 20, 30, is subjected to a translation movement in the XZ plane of a medium 50.

In the case of a translation movement, represented by the arrow 51 in FIG. 2a, the two sensors 20 and 30 are each used to perform a measurement of the speed associated with a translation movement, that is of the speed of displacement of the medium in which the sensors, and more generally the data acquisition module 10, are located.

The first sensor 20 is used to obtain a speed $V_1$ and the second sensor 30, for its part, is used to obtain a speed $V_2$. The translation speed. $V_t$ of the medium 50 is then estimated as half of the sum of the values obtained by each of the sensors 20 and 30, namely a speed $V_t=(V_1+V_2)/2$. Incidentally, in such conditions, the use of two sensors in place of a single sensor results in an increase of 3 dB in the instrument signal to noise ratio.

In FIG. 2b, this same system, also shown partially with the pair of motion sensors 20, 30 is subjected to a rotation movement of the same medium 50 around the Y component orthogonal to the XZ plane and passing through the centre O of the module 10.

In the case of a rotation movement, represented by the arrows 52, 53, 54 and 55, the two sensors 20 and 30 are each used to perform a measurement of the rotation speed associated with the rotation movement of the medium 50.

In fact, under the effect of a rotation movement, the sensors 20 and 30 undergo a displacement in the opposite direction. Thus, for a rotation speed ω of the medium 50, the sensors 20 and 30 are used to obtain a speed of $V_1$ and $V_2$ respectively, where $V_1=R\omega$ and $V_2=-R\omega$, where R is the radius of the circle of centre O and passing through the respective centres $C_1$ and $C_2$ of the motion sensors 20 and 30, with the centre O of the circle coinciding with the centre of the module 10 and centres $C_1$ and $C_2$ respectively coinciding with the centres of the faces 11 and 12 of the module 10. The distance separating the centres $C_1$ and $C_2$ of the motion sensors 20 and 30 is therefore 2 R.

By subtraction of the values $V_1$ and $V_2$ acquired by sensors. 20 and 30, it is therefore possible to ascertain the value of the rotation speed ω of the medium 50, then determined by the relation $\omega=(V_1-V_2)/2 R$.

The rotation movement which is acquired by the motion sensors 20, 30 of the data acquisition system can be obtained with a chosen precision. In fact, the greater the distance separating the centres $C_1$ and $C_2$ of the motion sensors 20 and 30, the greater the sensitivity to a rotation movement of the medium 50. It is therefore quite possible to adapt the dimensions of the data acquisition system as a function of the desired precision of the information on the rotation speed of the medium.

In order to perform measurements of translation movements according to three first independent components in space, and of rotation movements around these three independent components, that is to form a six-component data acquisition system according to the invention, it proves necessary to employ at least six translation motion sensors arranged in pairs, as described above.

Figure 3:
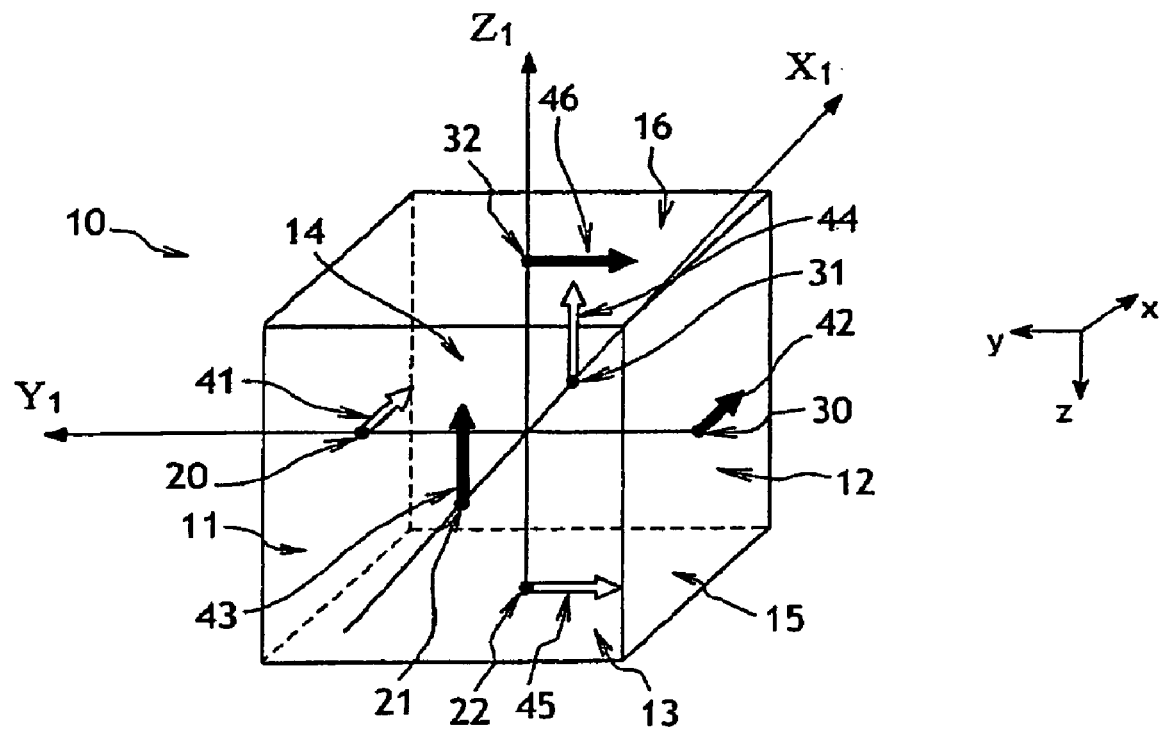
FIG. 3 is a diagrammatic view in perspective of one preferred method of implementation, provided by way of a non-limited example, of a data acquisition system according to this present invention.

FIG. 3 presents such a system diagrammatically and in perspective view, according to one preferred method of implementation.

The six-component data acquisition system includes means composed of three pairs of motion sensors referenced 20, 30, 21, 31 and 22, 32, accommodated in a module 10. These are translation motion sensors.

The motion sensors of one sensor pair are positioned symmetrically with each other in relation to the geometrical centre O of the module 10.

The module 10 employed is of parallelepiped shape, and preferably of cubic shape.

Given the shape of the module 10, each of the motion sensors 20, 30, 21, 31, 22, 32 is preferably positioned at the centre of the respective faces 11, 12, 13, 14, 15, 16.

The geometrical axis Y1 passing through the motion sensors of one pair of sensors 20, 30 is orthogonal to the geometrical axis X1 or Z1 passing through the motion sensors of another pair of sensors 21, 31 or 22, 32.

For each pair of motion sensors, the respective sensitive axes of the motion sensors forming the pair concerned are parallel, and preferably oriented in the same direction and the same sense.

The parallel sensitive axes 41, 42 of one pair of sensors 20, 30 are orthogonal firstly with the parallel sensitive axes 43, 44 and 45, 46 of another pair of sensors.

More precisely, in this preferred method of implementation, motion sensors 20 and 30 are respectively fixed to two parallel and opposite faces 11 and 12 of the module 10 and in the XZ plane, motion sensors 21 and 31 are respectively fixed to two parallel and opposite faces 13 and 14 of the module 10 and in the YZ plane, and motion sensors 22 and 32 are respectively fixed to two parallel and opposite faces 15 and 16 of the module 10 and in the XY plane, and this conforms, for each of these pairs of motion sensors, to the description provided to explain FIGS. 2a and 2b.

Each motion sensor 20, 30, 21, 31, 22, 32 is preferably a motion sensor with a single sensitive axis, referenced 41, 42, 43, 44, 45, 46 respectively.

With such an arrangement, it is possible to ascertain both the translation and rotation speeds of the medium for which one is seeking to detect the dynamic behaviour in the different spatial components by performing, for each motion sensor pair, a calculation of the half-sum and half-difference of the speeds measured for each of these components in space, namely the calculation described above with reference to FIGS. 2a and 2b.

Nevertheless, in order to obtain an exact measurement of the translation and rotation speeds of the medium, it is necessary to perform a calibration, without which the value measured directly would be inaccurate. In fact, there can be manufacturing defects in the module (in the orthogonality of the walls for example), lack of precision in the positioning of the sensors, or lack of precision associated with the sensitivity of the sensors.

The movements measured by the sensors, and the actual movements of the medium in which the module is located with its sensors, can each be represented by a six-row column matrix, namely matrices $\overline{m}$ and $\overline{v}$ respectively. These two column matrices are linked by a square and invertible matrix A according to the relation $\overline{v} = A^{-1} \overline{m}$ (E1), where the coefficients of this matrix A depend mainly on the sensitivity of the motion sensors and their location within module, that is the distance of the centre of the sensors from the centre of the module and the angle of their sensitive axis in relation to the axes of the module.

As a consequence, this calibration is most commonly performed after the manufacture of the module 10 including its motion sensors.

Calibration consists of obtaining the coefficients of the A matrix.

In order to ascertain these coefficients, it is possible, for example, to apply to the module obtained after manufacture an exclusive translation on an X axis, acquiring the measured data, then to repeat the same operations in an exclusive manner on a Y axis and a Z axis, and to continue with exclusive rotations around these three axes, X, Y and Z, where axes X, Y, Z are mutually orthogonal in pairs.

When the coefficients have been acquired, that is once matrix A is known by solution of equation (E1), it is then only necessary to invert matrix A and to store the coefficients of this matrix $A^{-1}$, preferably in the module itself.

With this calibration, the motion sensors do not need to have a very precise sensitivity, since these sensitivity errors can be corrected. By virtue of this calibration, the geometrical quality of the support, and the positioning of the sensors on this support, do not necessitate extreme rigour, since the defects are compensated for by the method. The additional cost associated with the calibration stage is clearly cancelled out by the reduced manufacturing constraints.

The description provided to explain FIGS. 2a, 2b and 3 concerns one preferred method of implementation of the invention. However, many variants can be envisaged.

Figure 4:
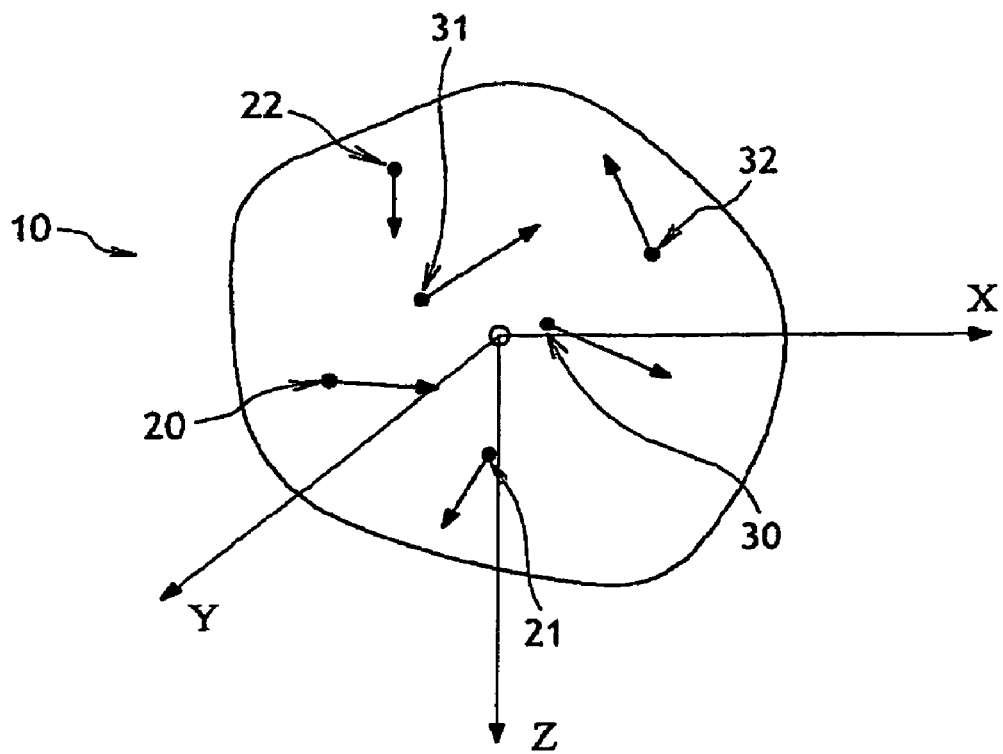
FIG. 4 is a diagrammatic view in perspective of a data acquisition system according to one alternative and generalised method of implementation of the invention.

For example, one alternative method of implementation, as illustrated in FIG. 4, can include a module and motion sensors arranged so that the sensors are positioned more or less indifferently in the volume of the module 10, that is at indifferent distances from the centre O of the module 10 and with indifferent orientation and direction.

To the extent that this module is calibrated in accordance with the calibration method described above, it is possible to measure the six components of movement of the medium in which the module is moving, in as precise a manner as with a parallelepiped module as described earlier, if relation (E1) is applied.

To this end, it suffices that calibration matrix A should be invertible, since this excludes a small number of singular positions of the motion sensors, such as two sensors combined for example, or all of the sensors in one or two planes.

This makes it possible in particular to envisage modules of non-parallelepiped shape, and in general not having orthogonal walls, or again not positioning the motion sensors of a given pair at the centre of the faces of a module of parallelepiped shape. This generalisation therefore removes the constraints concerning the form factor of the module.

The description provided to explain FIGS. 2a, 2b, 3 and 4 concerns means 20, 30, 21, 31, 22, 32 in the form of translation motion sensors, but it is possible to envisage the use, as motion sensors, of at least three translation motion sensors and at least three rotation motion sensors.

Finally, the system according to the invention can also include means used to form a six-component system, other means such as one or more sensors chosen, by way of a non-limited example, from a pressure sensor and/or a temperature sensor.

This present invention, concerning a six-component seismic data acquisition system, is not limited to the methods of implementation described above, but extends to any method of implementation that conforms to its spirit.

By any method of implementation that conforms to its spirit is meant any method of implementation of a seismic data acquisition system used to acquire six independent measurements corresponding to the three translation components in the three directions in space and to the three rotation movements around three other components in that space, namely around the three directions in space.

The invention claimed is:

1. A seismic data acquisition system, comprising: a plurality of sensors arranged to measure translation movements in a medium with three independent spatial components and an independent rotation component around each of the three independent spatial components, thus forming a system having six components, namely said three independent spatial components and said independent rotation component around each of the three independent spatial components, wherein the plurality of sensors comprise six sensors of the translation motion type, wherein each of the six sensors of the translation motion type measures a translation along its own single sensitive axis, and wherein the six sensors of the translation motion type are accommodated in a module and are arranged in respect of position and direction, so that a matrix linking a vector m representing the six translation movements measured by said six translation motion type sensors, and a vector v representing actual movements of the medium and having said six components, namely said three independent spatial components and the three independent rotation components around each of the three independent spatial components, is invertible.

2. The system according to claim 1, wherein the motion sensors are arranged in pairs so that the motion sensors of one pair of sensors are positioned symmetrically to each other in relation to a geometrical centre of a module.

3. system according to claim 1, wherein the motion sensors are arranged so that a geometrical axis passing through the motion sensors of one pair of sensors is orthogonal to the geometrical axis passing through the motion sensors of another pair of sensors.

4. The system according to claim 1, wherein the motion sensors of one pair of sensors are arranged so that their sensitive axis are parallel.

5. The system according to claim 1, wherein the motion sensors of one pair of sensors are arranged so that their sensitive axes are parallel, the parallel sensitive axes of one pair of sensors being orthogonal with the parallel sensitivity axes of another pair of sensors.

6. The system according to claim 1, further comprising a module having a cubic shape.

7. A method for acquiring seismic data, comprising:

arranging a plurality of sensors comprising six motion sensors of the translation motion type comprising three independent spatial components and an independent rotation components around each of the three independent spatial components, wherein each of the six sensors of the translation motion type measures a translation along its own single sensitive axis;

carrying out measurements using the six motion sensors of the translation motion type in a medium to obtain measurements of six translation movements having three independent spatial components; accommodating the motion sensors of the translation motion type in respect of position and direction, so that a matrix linking a vector m representing the six translation movements measured by said six translation motion type sensors, and a vector v representing actual movements of the medium and having six components, namely said three independent spatial components and said independent rotation component around each of the three independent spatial components, is invertible, wherein the measurements of six translation movements in the medium with three independent spatial components obtained from the six motion sensors of the translation motion type are used to obtain said three independent rotation components around each of the three independent spatial components.

8. The method according to claim 7, further comprising arranging the plurality of sensors in pairs so that the sensors of one pair of sensors are positioned symmetrically to each other in relation to a geometrical centre of a module.

9. The method according to claim 7, further comprising arranging the plurality of sensors so that a geometrical axis passing through the sensors of one pair of sensors is orthogonal to the geometrical axis passing through the sensors of another pair of sensors.

10. The method according to claim 7, further comprising arranging the sensors of one pair of sensors such that sensitive axes of the sensors are in parallel.

11. The method according to claim 7, further comprising arranging the sensors of one pair of sensors such that sensitive axes of the sensors are in parallel, wherein the parallel sensitive axes of one pair of the sensors is orthogonal to the parallel sensitive axes of another pair of sensors.

12. The method according to claim 7, further comprising a module having a cubic shape.

13. A seismic data acquisition system, comprising:

means for measuring translation movements in a medium with three independent spatial components; means for measuring rotation movements around each of the three independent spatial components, the means for measuring rotation movements around each of the three independent spatial components comprising an independent rotation component of the translation type around each of the independent spatial components; and a module accommodating the means for measuring translation and rotation movements, which means are arranged in a quasi-unspecified way in respect of position and direction, so that a matrix linking a vector m representing movements measured by the means for measuring, and a vector v representing actual movements of the medium, is invertible.

14. The seismic data acquisition system according to claim 13, further comprising a module having a cubic shape.

* * * * *